(12) United States Patent
Kato et al.

(10) Patent No.: US 6,773,819 B2
(45) Date of Patent: Aug. 10, 2004

(54) PAINT COMPOSITIONS FOR MOTORCARS

(75) Inventors: Kazuhiro Kato, Nishi-Kamo-gun (JP);
Kazuaki Kitazono, Nishhin (JP);
Yoshizumi Matsuno, Hadano (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 7 days.

(21) Appl. No.: 10/281,955

(22) Filed: Oct. 29, 2002

(65) Prior Publication Data

US 2003/0138634 A1 Jul. 24, 2003

(30) Foreign Application Priority Data

Nov. 2, 2001 (JP) .......................................... 2001-337357

(51) Int. Cl.$^7$ ........................ C09D 167/02; B32B 27/08; B32B 27/36
(52) U.S. Cl. ........................ 428/482; 428/458; 525/131; 525/176; 525/166
(58) Field of Search ................................. 525/176, 131, 525/166; 428/482, 458

(56) References Cited

U.S. PATENT DOCUMENTS 5,397,641 A * 3/1995 Moens et al. ................ 428/357

* cited by examiner

Primary Examiner—Patricia A. Short
(74) Attorney, Agent, or Firm—Wenderoth, Lind & Ponack, L.L.P.

(57) ABSTRACT

This invention provides a paint composition for motorcars, which comprises a carboxyl-containing polyester resin which contains a unit or units derived from alicyclic polybasic acid (a) and/or alicyclic polyhydric alcohol (b), and a vinyl polymer having epoxy group(s) and hydroxyl group(s) within one molecule, and which is capable of forming cured coating having Universal Hardness (HU) not higher than 500 N/mm$^2$.

16 Claims, 1 Drawing Sheet

Fig. 1

PAINT COMPOSITIONS FOR MOTORCARS

This invention relates to paint compositions for motorcars, which are capable of forming cured coating excelling in resistance to scratches, mars caused by car-washing machines and acid.

Recently mars on motorcar bodies incurred by car-washing machines which now are more widely used, scratches around keyholes, and furthermore etching and stains caused by acid precipitation have emerged as problems in coatings for motorcars, and their solution is in demand. The demand is particularly strong among car users who place more importance on outer appearance of cars.

Consequently, in the field of automobile production, development of paint compositions for motorcars capable of forming cured coating concurrently meeting the three performance requirements, i.e., scratch resistance, resistance to mars incurred by car-washing machines (scrub resistance) and acid resistance, is now one of important subjects for raising commercial value of motorcars. A number of proposals have heretofore been made with the view to solve the problem.

For example, JP-Hei 2 (1990)-222753A disclosed improvement in scrub resistance of the coating by concurrent use of acrylic resin of high hydroxyl value and monomeric melamine resin, which are baked in the presence of acid catalyst to form coating of high crosslinking density. This crosslinked system, however, has a defect that the formed coating is inferior in acid resistance, due to the coating crosslinked with melamine resin is easily decomposed with acid.

As a crosslinking system intended to form a coating in which the scrub resistance and acid resistance are made compatible by introducing another acid-resistant crosslinking system into such weakly acid-resistant melamine resin crosslinking system, for example, a composite crosslinking system of carboxyl group(s)/epoxy group(s)/ hydroxyl group(s)/ melamine resin (U.S. Pat. No. 5,087,286, EP-A-388858) or a composite crosslinking system of hydroxyl group(s)/alkoxysilyl group(s)/melamine resin (WO91/16383) have been proposed, but the improvement in acid resistance achieved thereby is not necessarily satisfactory, because of the use of melamine resin in all of these.

On the other hand, proposals have also been made for crosslinking systems avoiding use of melamine resins whose weakpoint lies in low acid resistance, such as, for example, a crosslinking system composed of combination of carboxyl group(s)/epoxy group(s) or one composed of combinations of carboxyl group(s)/epoxy group(s)/hydroxyl group(s) (e.g., U.S. Pat. No. 4,764,430, EP-A-212457, EP-A-353734 and U.S. Pat. No. 5,270,392, EP-A-450963). Coatings formed through utilization of these crosslinking systems excel in acid resistance, but are subject to a defect that their resistance to scratches and scrubbing is insufficient because of insufficient crosslinking density.

Also as a crosslinking system composed of combination of carboxyl group(s)/epoxy group(s)/hydrolysable silyl group(s), resin compositions comprising carboxyl-containing vinyl polymer(s) and epoxy- and hydrolysable silyl-containing compound (U.S. Pat. No. 4,764,430, EP-A-275138) are known. The compositions, however, are subject to a defect that their curing reaction does not sufficiently progress, due to the steric hindrance attributable to concurrent presence of epoxy groups and hydrolysable silyl groups within a same molecule.

Furthermore, as a crosslinking system composed of combination of carboxyl group(s)/epoxy group(s)/hydroxyl group(s), resin compositions comprising a silicone polymer containing hydroxyl groups and carboxyl groups, polymer containing carboxyl groups and carboxylic acid ester groups and a polymer containing hydroxyl groups and epoxy groups have been proposed (JP-Hei 6 (1994)-166741A), which however are open to a problem that cured coatings formed therefrom are insufficient in crosslinking density.

As a paint composition to give coating exhibiting improved soiling resistance and scrub resistance, JP-2000-136332A proposed organic solvent-based, thermosetting paint composition comprising a thermosetting resin composition formed of a base resin such as acrylic resin, polyester resin, alkyd resin, urethane resin and the like; a crosslinker component for crosslinking said composition, selected from melamine resin, urea resin, guanamine resin, optionally blocked polyisocyanate compound and carboxyl-containing compound; and further a minor amount of colloidal silica added to said thermosetting resin composition. Cured coating formed from this paint composition, however, exhibits insufficient acid resistance.

As above, none of those paints for motorcars heretofore proposed is found to form cured coating concurrently exhibiting the three performances of satisfactory scratch resistance, resistance to mars incurred by car-washing machines and acid resistance in good balance.

The main object of the present invention is to provide paint compositions for motorcars, which are capable of forming cured coating excelling in all of scratch resistance, resistance to mars incurred by car-washing machines and acid resistance.

As a result of concentrative studies, we now have come to find that the above object could be accomplished by using as the base resin a carboxyl-containing polyester resin which contains a unit or units derived from alicyclic polybasic acid and/or alicyclic polyhydric alcohol. The present invention is whereupon completed.

Thus, according to the present invention, a paint composition for motorcars, which comprises
(A) a carboxyl-containing polyester resin also containing a unit or units derived from alicyclic polybasic acid (a) and/or alicyclic polyhydric alcohol (b), and
(B) a vinyl polymer having epoxy group(s) and hydroxyl group(s) within one molecule,
and which is capable of forming cured coating having Universal Hardness (HU) not higher than 500 N/mm$^2$.

Hereinafter the paint composition for motorcars of the present invention ("present paint composition") is explained in further details.

Polyester Resin (A)

Polyester resin (A) which is used as the base resin in the present paint composition is a carboxyl-containing polyester resin prepared by using an alicyclic polybasic acid (a) and/or an alicyclic polyhydric alcohol (b) as the essential monomeric components, if necessary in combination with other polybasic acid (c) and/or other polyhydric alcohol (d).

The alicyclic polybasic acid (a) is a compound containing at least one alicyclic ring, preferably a 4- to 6-membered alicyclic ring, and at least 2, preferably 2–3 carboxyl groups, per molecule, specific examples of which include cyclohexane-1,3-dicarboxylic acid, cyclohexane-1,4-dicarboxylic acid, hexahydrophthalic acid, hexahydroisophthalic acid, hexahydroterephthalic acid, hexahydrotrimellitic acid, tetrahydrophthalic acid, methyl hexahydrophthalic acid, and anhydrides of those acids.

Other useful polybasic acids (c) include compounds containing at least two carboxyl groups per molecule, which are customarily used as acid component for polyester production. As examples of such acids, phthalic acid, isophthalic acid, terephthalic acid, succinic acid, adipic acid, azelaic acid, sebacic acid, maleic acid, fumaric acid, itaconic acid, trimellitic acid, pyromellitic acid and anhydrides of those acids may be named.

Alicyclic polyhydric alcohol (b) is a compound containing at least one alicyclic ring, preferably a 4- to 6-membered alicyclic ring, and at least 2, preferably 2–3 hydroxyl groups, per molecule, specific examples including cyclohexane-1,4-dimethylol, hydrogenated bisphenol A, spiroglycol and dihydroxymethyltricyclodecane.

Other useful polyhydric alcohols (d) include those compounds containing at least two hydroxyl groups per molecule, which are customarily used as alcohol component for polyester production. As examples of such alcohols, glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, hydroxypivalic acid neopentyl glycol ester and the like; polylactone diols formed by adding lactones such as ε-caprolactone to these glycols; polyester diols such as bis(hydroxyethyl)terephthalate; and polyhydric alcohols having at least 3 hydroxyl groups per molecule, such as glycerine, trimethylolpropane, trimethylolethane, diglycerine, triglycerine, 1,2,6-hexanetriol, pentaerythritol, dipentaerythritol, tripentaerythritol, sorbitol and mannitol can be named.

The use rate of alicyclic polybasic acid (a) and/or alicyclic polyhydric alcohol (b) [the sum of (a) and (b)] in production of polyester resin (A) is usually 20–70%, preferably 30–60%, inter alia, 35–55%, based on the total amount of the monomers used for production of the polyester resin (A), the percentages being by weight.

Production of polyester resin (A) from above-described alicyclic polybasic acid (a) and/or alicyclic polyhydric alcohol (b), and optionally other polybasic acid (c) and/or other polyhydric alcohol (d) can be conducted by a method known per se. For example an object carboxyl-containing polyester resin (A) can be obtained by carrying out the esterification under conditions of molar excess of such polybasic acid component.

So obtained polyester resin (A) generally has a weight-average molecular weight within a range of 1,000–1,000,000, preferably 1,000–100,000, inter alia, 2,000–80,000; and an acid value within a range of generally 50–500 mgKOH/g, preferably 55–350 mgKOH/g, inter alia, 60–200 mgKOH/g.

Vinyl Polymer (B)

The present paint composition contains, as a component for curing the composition through crosslinking reaction with above-described carboxyl-containing polyester resin serving as the base resin, a vinyl polymer (B) containing epoxy group(s) and hydroxyl group(s) within one molecule.

As the vinyl polymer (B) to be contained in the present paint composition, copolymers obtained by copolymerizing by a known method, e.g., solution polymerization method, epoxy-containing ethylenically unsaturated monomer, hydroxyl-containing unsaturated monomer and, where necessary, alkoxysilyl-containing ethylenically unsaturated monomer and/or other ethylenically unsaturated monomer are preferred.

Said epoxy-containing ethylenically unsaturated monomer is a compound containing at least one each, preferably one each, of epoxy group and ethylenically unsaturated bond per molecule, such as, for example, glycidyl (meth)acrylate, allyl glycidyl ether or the like.

Said hydroxyl-containing ethylenically unsaturated monomer is a compound containing at least one each, preferably one each, of hydroxyl group and ethylenically unsaturated bond per molecule, examples of which include hydroxyalkyl esters of (meth)acrylic acid such as hydroxyethyl (meth)acrylate, hydroxypropyl (meth)acrylate and hydroxybutyl (meth)acrylate; (poly)ethylene glycol mono (meth)acrylate, (poly)propylene glycol mono(meth)acrylate, reaction products of those hydroxyl-containing unsaturated monomers with lactone compounds such as β-propiolactone, dimethylpropiolactone, butyrolactone, γ-valerolactone, γ-caprolactone, γ-caprylolactone, γ-laurylolactone, ε-caprolactone and δ-caprolactone [e.g., Placcel™ FM1, Placcel FM2, Placcel FM3, Placcel FA1, Placcel FA2, Placcel FA3 (Daicel Chemical Industries, Ltd., caprolactone-modified (meth)acrylic acid hydroxyesters)]. Of those, $C_2$–$C_6$ hydroxyalkyl esters of (meth)acrylic acid are preferred.

Said alkoxysilyl-containing ethylenically unsaturated monomer is a compound containing at least one each, preferably one each of alkoxysilyl group represented by a formula $(R^1O)_{3-n}(R^2)_n Si—$ [wherein $R^1$ stands for an optionally alkoxy-substituted alkyl group, $R^2$ stands for an alkyl group and n is 0, 1 or 2] and ethylenically unsaturated bond, specific examples including vinyl trimethoxysilane, vinyl methyldimethoxysilane, vinyl triethoxysilane, vinyl methyldiethoxysilane, vinyl tris(2-methoxyethoxy)silane, γ-(meth)acryloyloxypropyltrimethoxysilane, γ-(meth)acryloyloxypropylmethyldimethoxysilane, β-(meth)acryloyloxyethyltrimethoxysilane, γ-(meth)acryloyloxypropyltriethoxysilane, γ-(meth)acryloxyoxypropylmethyldiethoxysilane and the like. Of these, in respect of low-temperature curability and storage stability, those in which $R^1$ in the alkoxysilyl group is ethyl, $R^2$ is methyl and n is 0 or 1, such as vinyl triethoxysilane, vinyl methyldiethoxysilane, γ-(meth)acryloyloxypropyltriethoxysilane and γ-(meth)acryloyloxypropylmethyldiethoxysilane are preferred.

Said other ethylenically unsaturated monomer is a compound containing at least one, preferably one only, ethylenically unsaturated bond per molecule, other than above epoxy-containing unsaturated monomer, hydroxyl-containing unsaturated monomer and alkoxysilyl-containing ethylenically unsaturated monomer. For example, $C_1$–$C_{18}$ alkyl or cycloalkyl esters of (meth)acrylic acid such as methyl (meth)acrylate, ethyl (meth)acrylate, propyl (meth) acrylate, butyl (meth)acrylate, hexyl (meth)acrylate, octyl (meth)acrylate, lauryl (meth)acrylate and cyclohexyl (meth) acrylate; aromatic polymerizable monomers such as styrene and α-methylstyrene; (meth)acrylamides such as (meth) acrylamide, N-butoxymethyl (meth)acrylamide, N-methylol (meth)acrylamide, and their derivatives; and (meth) acrylonitrile may be named. In particular, use of $C_1$–$C_{18}$ alkyl or cycloalkyl esters of (meth)acrylic acid and aromatic monomers such as styrene is preferred.

These monomeric components are used in general terms preferably within the ranges, based on the total weight of the monomers, epoxy-containing ethylenically unsaturated monomer, 5–60 wt %, in particular, 10–50 wt %; hydroxyl-containing ethylenically unsaturated monomer, 3–50 wt %, in particular, 5–30 wt %; alkoxysilyl-containing ethylenically unsaturated monomer, 0–40 wt %, in particular, 5–20 wt %; and other ethylenically unsaturated monomer, 10–80 wt %, in particular, 20–50 wt %. Whereas, when styrene is used as such other ethylenically unsaturated monomer, its use is desirably kept no higher than 20 wt %, from the viewpoint of weatherability of formed cured coating.

The vinyl polymer (B) used in the present paint composition generally has a weight-average molecular weight within a range of 500–6,000, preferably 500–3,000; and generally has an epoxy value within a range of 0.8–3.6, preferably 1.2–3.2 mmol/g, and a hydroxyl value within a range of 50–600 mgKOH/g, preferably 60–250 mgKOH/g.

Rheology-controlling Agent (C)

The present paint composition can contain a rheology-controlling agent (C) in certain cases in addition to above-described two components (A) and (B), with the view to impart thixotropic property to the paint composition.

The paint composition which contains such a rheology-controlling agent (C) can have a sufficiently reduced viscosity in occasions of the composition being subjected to high shear stress, e.g., in occasions of spray-coating, to allow easy spray-coating operation. On the other hand, in such occasions that little shear stress is exerted after it is coated on object surfaces, its apparent viscosity can be increased. In consequence, when the composition is applied onto perpendicular object surfaces or during the subsequent baking following the application, occurrence of coating defects such as dripping, cissing and the like can be prevented and favorable coating finish can be achieved. Furthermore, we found that blending of a rheology-controlling agent (C) with present paint compositions according to the invention is useful also for adjusting Universal Hardness (HU) and the indentation depth creep (I) at 0.4 mN load of coatings formed therefrom, within the respectively intended ranges.

As rheology-controlling agents (C) having such effects, for example, fine particles of crosslinked polymers, polyurea compounds and the like can be named.

As such fine particles of crosslinked polymers, internally crosslinked, fine particulate polymers which are known per se and are obtained by aqueous emulsion or aqueous suspension polymerization method or non-aqueous dispersion polymerization method can be used.

Of those, fine particulate polymers having intramolecularly crosslinked structure which are obtained by aqueous emulsion or aqueous suspension polymerization method can be solidified as separated by such physical or chemical means as evaporation or azeotropic distillation of water, or precipitation or agglomeration of the polymer (particles). It is also possible to directly replace a medium of the intended fine, crosslinked polymer particles from water to other resin, organic solvent and the like, in the occasion of applying such physical or chemical means.

As the fine, crosslinked polymer particles, those obtained by emulsion polymerization of a polymerizable monomer having at least two radical-polymerizable unsaturated groups in its molecule and other radical-polymerizable, unsaturated monomer(s) in the presence of a reactive emulsifying agent containing allyl group(s) in its molecule as disclosed in JP-Hei 3 (1991)-66770A (=U.S. Pat. No. 5,348, 998), can be conveniently used.

Also as fine particles of crosslinked polymers, non-aqueous liquid dispersions of fine, particulate polymers insolubule in the organic solvent serving as their dispersion medium, such as those disclosed in JP-Hei 1 (1989)-95116A (=U.S. Pat. No. 5,198,503, EP-A-308203) can also be conveniently used, which dispersion is prepared by using a polymer, whose essential monomeric component is an alkoxysilyl-containing vinyl monomer, as a dispersion stabilizer and polymerizing radical-polymerizable unsaturated monomer(s) in an organic solvent in the presence of said stabilizer polymer. This fine, particulate polymer is internally crosslinked with said alkoxysilyl-containing vinyl monomer component, and the degree of the internal crosslinking can be still raised by using, as a part of the radical-polymerizable unsaturated monomer component, a monomer having at least two radical-polymerizable unsaturated bonds in its molecule.

Those fine, crosslinked polymer particles have high crosslinkage density and are substantially non-swelling and non-fusible even in organic solvent of high polymer-dissolving ability such as toluene or ethyl acetate. When added to the present composition which contains an organic solvent, the particles scarcely raise viscosity of the present paint composition and enable to provide a solution (dispersion) of high resin content, i.e., high solid composition.

Generally suitable average particle size of the fine, crosslinked polymer particles is within a range of around 0.01–2 μm, in particular, 0.05–0.5 μm. When the particle size falls within the above range, the paint compositions provide coatings excelling in dripping-prevention and finished appearance.

As said rheology-controlling agent (C), furthermore, a solid, particulate polyurea compound as disclosed in JP-Hei 7 (1995)-81099B (=U.S. Pat. No. 4,677,028), which is formed of a reaction product of isocyanurate trimer obtained from $C_3$–$C_{20}$, preferably $C_5$–$C_{14}$, inter alia, $C_8$–$C_{12}$, diisocyanate compound with an amine compound having at least one primary amino group may also be used.

As the diisocyanate compound, for example, methylene diisocyanate, trimethylene diisocyanate, tetramethylene diisocyanate, hexamethylene diisocyanate, ω,ω' dipropyl ether diisocyanate, thiodipropyl diisocyanate, cyclohexyl-1, 4-diisocyanate, dicyclohexylmethane-4,4'-diisocyanate, 1,5-dimethyl-2,4-bis(isocyanatomethyl)-benzene, 1,5-dimethyl-2,4-bis(ω-isocyanatoethyl)-benzene, 1,3,5-trimethyl-2,4-bis (isocyanatomethyl)-benzene, 1,3,5-triethyl-2,4-bis (isocyanatomethyl)-benzene, heterocyclic diisocyanate commercially available under the trademark of Desmodur TT (Bayer AG), dicyclohexyldimethylmethane-4,4'-diisocyanate, 2,4-toluene diisocyanate, 2,6-toluene diisocyanate and diphenylmethane-4,4'-diisocyanate can be used. In particular, hexamethylen diisocyanate is preferred. These diisocyanate compounds can be used each singly or, two or more of them may be concurrently used to form trimers constituted of different diisocyanate compounds.

On the other hand, amine compounds which are to be reacted with isocyanurate trimers for producing the polyurea compounds can be those containing at least one primary amino group per molecule and not more than 55, preferably 1–24, inter alia, 1–12 carbon atoms. Specific examples include alkylamines such as ethylamine, n-propylamine, sec-propylamine, n-butylamine, sec-butylamine, tert-butylamine, n-pentylamine, α-methylbutylamine, α-ethylpropylamine, β-ethylbutylamine, hexylamine, octylamine, decylamine and stearylamine; cycloalkylamines such as cyclohexylamine; aryl amines such as sniline; aralkylamines such as benzylamine and phenethylamine; and alkylenediamines such as hexamethylenediamine.

Also as the amine compounds, those containing at least one primary amino group and at least one ether bond (-0-) and/or hydroxyl group per molecule may be used, specific examples of which include ethanolamine, 6-aminohexanol, p-methoxybenzylamine, methoxypropylamine, 3,4- dimethoxyphenylethylamine, 2,5-dimethoxyaniline, furfurylamine, tetrahydrofurfurylamine and bis(3-aminopropyl)polytetrahydrofuran (one having a molecular weight of approximately 750).

Above-described amine compounds may be used either singly or in combination of two or more.

In the reaction of an isocyanurate trimer with an amine compound or compounds, either one of them can be used in stoichiometric excess but generally it is convenient to use them at such ratios that the number of primary amino groups of the amine compound(s) be within a range of 0.7–1.5, in particular, 0.9–1.1, per mol of the isocyanurate trimer.

The reaction of an isocyanurate trimer with amine compound(s) can usually be conducted at temperatures ranging from about 10 to about 150° C., preferably from about 20 to about 80° C., in the presence of a suitable solvent. In that occasion, it is convenient to carry out the reaction while adding the amine compound(s) to a solution of the isocyanurate trimer in the solvent. In some instances, the amine compound(s) may be added portionwise at plural stages. As suitable solvent, acetone, methyl isobutyl ketone, 1-methoxy-propanol-2, benzene, toluene, xylene or an aliphatic hydrocarbon such as petroleum ether may be named.

Thus produced solid, particulate polyurea compound preferably has an average particle size generally within a range from about 0.01 to about 50 μm, in particular, 0.1–20 μm.

Present Paint Composition

A paint composition for motorcars provided according to the present invention contains the above-described polyester resin (A) and vinyl polymer (B), in terms of equivalent ratio of carboxyl groups in the polyester resin (A) to epoxy groups in the vinyl polymer (B), at a ratio generally within a range of 1:0.5–0.5:1, in particular, 1:0.6–0.5:0.9, inter alia, 1:0.8–0.5:0.75.

In cases of using above-described rheology-controlling agent (C), it is generally preferred to use it within a range of 1–30 wt %, in particular, 1–20 wt %, inter alia, 3–15 wt %, based on the total weight (as solid) of the polyester resin (A) and the vinyl polymer (B), from the viewpoints of prevention of the coating from dripping and stability of the paint composition.

Those paint compositions for motorcars according to the present invention may further contain, in addition to the polyester resin (A) component, vinyl polymer (B), and rheology-controlling agent (C), ultraviolet absorber, photostabilizer, surface regulating agent, antioxidant, defoaming agent and other additives to paint, organic solvent, etc., where necessary. The compositions may also contain pigment if desired.

The present paint compositions can be prepared, for example, by homogeneously mixing the above-described components in organic solvent. As useful organic solvent, for example, hydrocarbon solvents such as toluene, xylene and high-temperature boiling petroleum hydrocarbons; ketone solvents such as methyl ethyl ketone, cyclohexanone and isophorone; ester solvents such as ethyl acetate, butyl acetate, ethylene glycol monoethyl ether acetate and diethylene glycol monoethyl ether acetate; alcoholic solvents such as methanol, ethanol and butanol; and ether solvents such as ethylene glycol monoethyl ether, ethylene glycol monobutyl ether and diethylene glycol monobutyl ether may be named. These can be used either singly or as mixtures of at least two of them.

Furthermore, with the view to promote crosslinking reaction in the coating formed of present paint composition to improve scratch resistance and resistance to mars incurred by car-washing machines, curing catalyst may be added to present paint composition. Examples of useful curing catalyst include quaternary salts such as tetraethylammonium bromide, tetrabutylammonium bromide, tetraethylammonium chloride, tetrabutylphosphonium bromide, triphenylbenzylphosphonium chloride and the like; and amines such as triethylamine, tributylamine and the like. Of these, quaternary salts are preferred. Furthermore, when approximately equivalent to the used quaternary salt of a phosphoric acid compound such as monobutylphosphoric acid, dibutylphosphoric acid or the like is used concurrently with the quaternary salt, storage stability of the paint can be improved without impairing catalytic action of the quaternary salt and decrease in operability such as spray-coatability of the paint due to drop in electric resistance can be prevented. Hence such a practice is preferred.

The use rate of such curing catalyst is not subject to particular limitation, but generally suitable use rate ranges 0.005–5 wt %, in particular, 0.01–3 wt %, based on the total amount of the polyester resin (A), vinyl polymer (B) and rheology-controlling agent (C) (as solid).

Those paint compositions according to the present invention may also be blended with a minor amount of various kinds of resins such as, for example, polyester resin, alkyd resin, silicone resin, fluorine-containing resin and the like; ordinary crosslinking agent such as melamine resin, blocked isocyanate and the like. Where necessary, it is also permissible to blend those compounds commonly referred to as dehydrator such as trimethyl orthoacetate, for controlling deterioration of paint caused by water present in organic solvent or in air.

Present paint compositions can usually be used at solid concentration levels of 30–70 wt %, preferably 40–60 wt %.

The present paint compositions can be applied onto substrate surfaces by application methods known per se, such as airless spraying, air spraying, rotary atomizing, electrostatic impressing and the like. Convenient thickness of applied coatings in that occasion is usually within a range of 10–80 μm, in particular, 20–60 μm, in terms of cured coating thickness. It is usually preferred to cure the applied coating by heating at temperatures ranging from about 100° C.–about 180° C., in particular, from about 120° C.–160° C., for about 10–60 minutes, in particular, for about 15–40 minutes.

By suitably adjusting the blend ratios of said polyester resin (A), vinyl polymer (B) and rheology-controlling agent (C) within the above-specified ranges for the present paint compositions, the coatings formed therefrom can exhibit Universal Hardness (HU) not higher than 500 N/mm$^2$, preferably in the range of 50–150 N/mm$^2$, inter alia, 80–140 N/mm$^2$; and further desirably have the indentation depth creep (I) at 0.4 mN load of at least 0.5 μm, preferably in the range of 0.5–1.0 μm, inter alia, 0.5–0.7 μm.

Coatings formed from the present paint compositions having Universal Hardness (HU) and also preferably the indentation depth creep (I) at 0.4 mN load, within the above-specified ranges concurrently possess suitable hardness and elasticity in good balance. When such a coating is scratched, the scars are apt to recover and return to the original state and exhibit excellent resistance properties to scratches and mars incurred by car-washing machines.

Universal Hardness (HU) and indentation depth creep (I) at 0.4 mN load of a coating formed from a present paint composition are the property values measured with a microhardness testing system, "Fischerscope™ H-100" of Helmut Fischer GmbH & Co. Universal Hardness (HU) is measured by applying a prescribed load on Vickers Indenter [a diamond pyramid with a square base area and with an angle of α=136°] placed on the coating to be tested, measuring the indentation (penetration) depth (h) of the indenter into the coating, and calculating the Hardness from the load exerted and the indented surface area determined from said indentation depth (h). Specifically, it is a value obtained by substituting the values of the tested load and indentation depth into the following equation (following VDI/VDE Standard 2616 ISO Technical Report TR 14577):

$$HU=F/(26.43 \times h^2)$$

F=tested load (mN)
h=indentation depth ($\mu$m)

Figure 1:
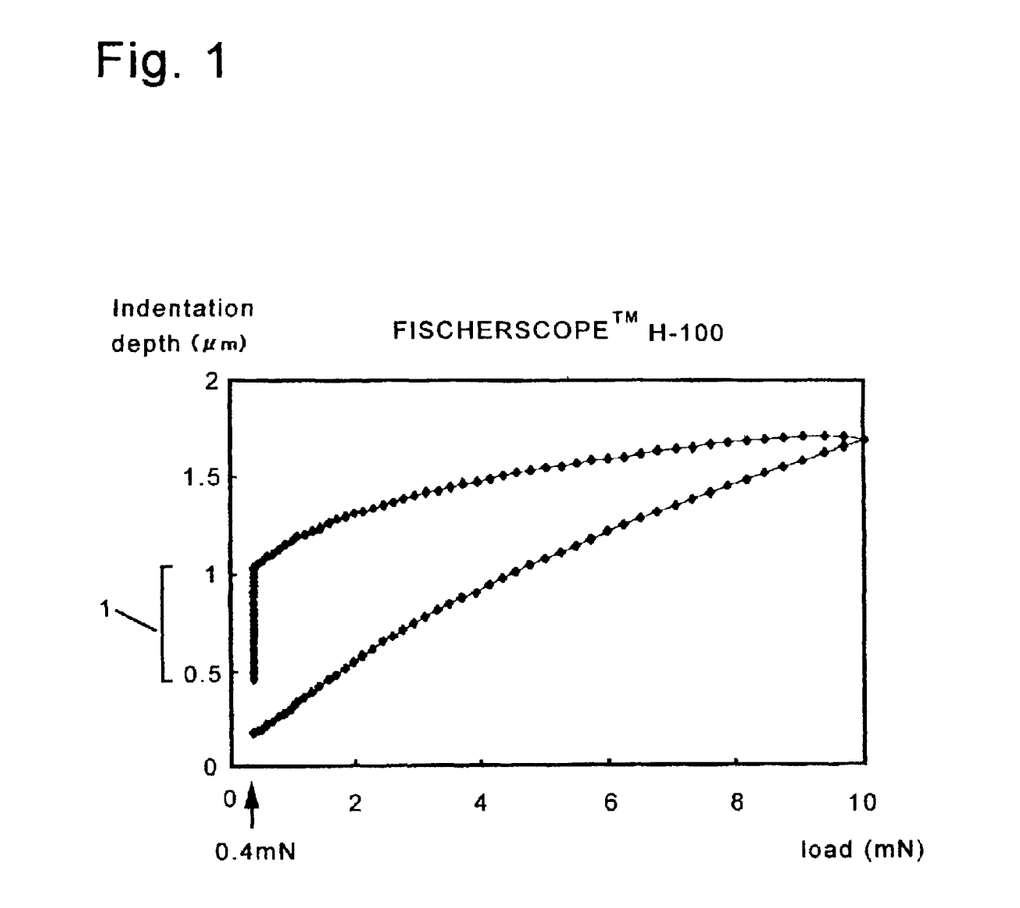

In measuring hardness of a coating with "Fischerscope™ H-100", a typical graph in which the relation between the load (horizontal axis) and indentation depth (vertical axis) is plotted is shown as FIG. 1.

"Indentation depth creep (I) at 0.4 mN load" as referred to in the present invention is measured as follows. Continuously increasing load from 0.4 mN to 10 mN is exerted on a coating to be tested, and then the load is gradually reduced back to 0.4 mN, at which the load is removed. The reduction in indentation depth in the tested coating in 100 seconds after removal of the load is the numerically expressed value of indentation depth creep (I) at 0.4 mN load, which is observed as "1" in FIG. 1. Coatings exhibiting large (I) values have elasticity and favorable scratch resistance.

As above-described, use of present paint compositions enables formation of cured coatings excelling in resistance to mars incurred by car-washing machines, scratch resistance and acid resistance.

Accordingly, present paint compositions can be advantageously used for forming top layer clear coating in multi-layered coating film composed of at least one layer of coloring base coating and at least one layer of clear coating.

Hereinafter processes for forming such multi-layered coating are described in further details.

Formation of Multi-layered Coating

Formation of multi-layered coating using a present paint composition can be performed by, for example, the following methods (a)–(c).

Method (a)

This method can be practiced in 2-coat-1-bake (2C1B) system or 2-coat-2bake (2C2B) system, which comprise: applying ordinary coloring base paint for motorcars onto metallic or plastic substrate for motorcar bodies, either directly or after applying a primer such as a cationic electropaint and if necessary a surfacer and curing them, by such means as airless spraying, air spraying or rotary atomizing application (which may be electrostatically impressed), to a cured coating film thickness of about 10–about 50 $\mu$m; heating the formed coloring base coating at about 100°–about 180° C., preferably at about 120°–about 160° C., for about 10–about 40 minutes to cure the coating, or allowing it to stand at room temperature for several minutes without effecting the curing or forcedly drying it at about 50°–about 80° C.; thereafter applying a clear paint composition for motorcars according to the present invention by a similar coating method to a cured coating film thickness of about 20–about 80 $\mu$m; and heating the coating at about 100°–about 180° C., preferably about 120°–about 160° C., for about 10–about 60 minutes to bring about crosslinkage and curing.

Method (b)

This method can be practiced by 3-coat-1-bake (3C1B), 3-coat-2-bake (3C2B) or 3-coat-3-bake (3C3B) systems, which comprise procedures similar to those of the above method (a), i.e., applying ordinary coloring base paint and curing, or leaving it at room temperature for several minutes without curing or forcedly drying it at about 50°–about 80° C.; applying a first clear paint composition for motorcars onto the coloring base coating by similar application means to a cured coating film thickness of from about 10 to about 50 $\mu$m; heating and curing the same at about 100°–about 180° C., preferably about 120°–about 160° C., for about 10–about 60 minutes, or leaving the coating at room temperature for several minutes without curing or forcedly drying it at about 50°–about 80° C.; then applying a second clear paint composition for motorcars according to the present invention by similar application means to a cured coating film thickness of from about 10 to about 80 $\mu$m; and heating and curing the coating at about 100°–about 180° C., preferably at about 120°–about 160° C., for about 10–about 60 minutes.

As the first clear paint composition for motorcars here, a top coating paint capable of forming a clear coating which is conventionally used for motorcar coating, or a clear paint composition of the present invention can be used.

Method (c)

This method can be practiced by 3-coat-1-bake (3C1B), 3-coat-2-bake (3C2B) or 3-coat-3-bake (3C3B) systems, which comprise procedures similar to those of the above method (a), i.e., applying a first coloring base paint and curing, or leaving it at room temperature for several minutes without curing or forcedly drying it at about 50°–about 80° C., to form the first coloring base coating; applying a second coloring base paint onto the first coloring base coating to a cured coating film thickness of from about 10 to about 50 $\mu$m; heating and curing the same at about 100°–about 180° C., preferably about 120°–about 160° C., for about 10–about 40 minutes, or leaving the coating at room temperature for several minutes without curing or forcedly drying it at about 50°–about 80° C.; then applying a clear paint composition of the present invention by similar application means to a cured coating film thickness of from about 10 to about 80 $\mu$m; and heating and curing the same coating at about 100–about 180° C., preferably at about 120–about 160° C., for about 10–about 60 minutes.

As the first coloring base paint, any conventional coloring base paint for motorcars can be used. As the second coloring base paint, transparent coloring paint having a minor hiding power of the extent allowing perception of color tone of the first coloring base paint (solid color, metallic color or iridescent color) underneath, through the second coloring base coating is used. Accordingly, hiding power of the second coloring base coating is generally less than that of the first coloring base coating.

As the color base paint, a present paint composition for motorcars of this invention blended with a coloring pigment may be used, or a coloring base paint conventionally used for top coating may be used.

As such conventional coloring base paints, for example, paint compositions formulated by blending curable resin components such as acrylic resin/amino resin (e.g., melamine resin or the like, same as in hereafter appearing amino resin) system, alkyd resin/amino resin system, polyester resin/amino resin system, acrylic resin/polyisocyanate system, alkyd resin/polyisocyanate system, polyester resin/polyisocyanate system and the like, with coloring pigment, can be used.

Form of coloring base paint is not critical, which may be organic solvent based, non-aqueous dispersion, aqueous solution, aqueous dispersion liquid or high solid type. Also as coating machine, conventional air spray gun, airless spray gun, air spray type electrostatic spray equipment, airless spray type electrostatic spray equipment, rotary atomizing electrostatic coater or the like can be used.

Thus, by any of above-described methods, a multi-layered coating excelling in resistance to mars incurred by car-washing machines, scratch resistance and acid resistance, which comprises at least one layer of coloring base coating and at least one layer of clear coating is provided, the top layer clear coating being formed of a paint composition according to the present invention.

Hereinafter the present invention is more specifically explained, referring to working examples. The scope of the present invention, however, is not limited by these examples. Parts and percentages appearing in the examples are by weight.

Production of Polyester Resin (A)
Production Example of Polyester Resin No. 1

A four-necked flask equipped with a heating device, stirrer, thermometer and a reflux condenser was charged with the following monomers:

| | |
|---|---|
| 1,4-cyclohexanedimethanol | 27 parts |
| trimethylolpropane | 65 parts |
| diethylene glycol | 16 parts |
| neopentyl glycol | 17 parts |
| 1,4-cyclohexanecarboxylic acid | 100 parts |
| adipic acid | 145 parts |
| dibutyltin dilaurate | 0.5 part | and the content was heated.

After the temperature of the content was raised from 160° C. to 230° C. over 3 hours, it was maintained at 230° C. for an hour, and the formed condensation water was distilled off through a rectification column. Then 5 parts of xylene was added to the content, the xylene and condensation water were refluxed, and the water was removed with a water separator. Two hours after addition of the xylene the content was cooled to 140° C. and the reaction was terminated. Further, mixed solvent A (note 1) was added to provide polyester resin No.1 having a solid content of 70%. This resin had a weight-average molecular weight of 3000 and an acid value of 130 mgKOH/g.

(note 1) mixed solvent A:

xylene/Swasol™ 1,000 (Cosmo Oil Co., Ltd. a high-boiling petroleum solvent)=50/50 (weight ratio).

Production Examples of Polyester Resin Nos. 2-4

Procedures of above production example of polyester resin No. 1 were repeated except that the monomeric composition was changed to those as shown in Table 1, to provide polyester resin Nos.2-4 each having a solid content of 70%. Table 1 concurrently shows the monomeric composition used for polyester resin No.1.

TABLE 1

| Polyester Resin | No. 1 | No. 2 | No. 3 | No. 4 |
|---|---|---|---|---|
| Monomeric Composition | | | | |
| 1,4-cyclohexanedimethanol | 27 | 74 | | 74 |
| trimethylolpropane | 65 | 65 | 65 | 65 |
| diethylene glycol | 16 | | | |
| neopentyl glycol | 17 | | 53 | |
| 1,4-cyclohexanedicarboxylic acid | 100 | 100 | | 100 |
| phthalic anhydride | | | 80 | 150 |
| adipic acid | 145 | 145 | 145 | |
| dibutyltin dilaurate | 0.5 | 0.5 | 0.5 | 0.5 |
| Physical Properties | | | | |
| weight-average molecular weight | 3000 | 3000 | 2900 | 3000 |
| acid value mgKOH/g | 130 | 130 | 130 | 130 |

Production of Vinyl Polymer (B)

A 5-liter glass flask equipped with a stirrer, thermometer and condenser was charged with 410 parts of xylene and 77 parts of n-butanol. The content was heated up to 125° C. with an electrothermal mantle, and into which a mixture of the following monomeric composition was dropped at a uniform rate over 4 hours. In the composition, azobisisobutyronitrile was polymerization initiator:

| | |
|---|---|
| glycidyl methacrylate | 432 parts |
| 4-hydroxy-n-butyl acrylate | 288 parts |
| n-butyl acrylate | 432 parts |
| styrene | 288 parts |
| azobisisobutyronitrile | 72 parts. |

Following the subsequent 30 minutes' aging, further a mixture of 90 parts of xylene, 40 parts of n-butanol and 14.4 parts of azobisisobutyronitrile was dropped over 2 hours, again followed by 2 hours' aging to provide a vinyl polymer solution.

Thus obtained polymer solution had a solid polymer content of 70% and Gardner viscosity (25° C.) U. The polymer had a weight-average molecular weight of 2000, an epoxy value of 2.12 mmol/g and a hydroxyl value of 78 mgKOH/g.

Production of Rheology-controlling Agent (C)

A 1-liter flask equipped with a stirrer, thermometer, condenser and a heating mantle was charged with 3547.5 parts of deionized water and 20 parts of 50% LATEMUL™ S-120A (Kao Corporation, a sulfosuccinic acid-derived, allyl-containing anionic reactive emulsifier). The content was heated to 90° C. under stirring, into which 20% of an aqueous solution of 12.5 parts of VA-086™ (Wako Pure Chemical Industries, Ltd., 2,2'-azobis[2-methyl-N-(2-hydroxyethyl)-propionamide]) which is a water-soluble azoamide polymerization initiator, as dissolved in 500 parts of deionized water was added. Fifteen (15) minutes thereafter, 5% of a monomeric mixture consisting of 150 parts of styrene, 550 parts of methyl methacrylate, 150 parts of n-butyl acrylate, 50 parts of 2-hydroxyethyl acrylate and 100 parts of 6-hexanediol diacrylate was added to the flask.

After further 30 minutes' stirring, dropwise addition of the remainder of the monomeric mixture and the polymerization initiator was started. Dropping of the monomeric mixture was conducted over 3 hours and that of the polymerization initiator, over 3.5 hours, during which the polymerization temperature was maintained at 90° C. After completion of dropping of the aqueous solution of polymerization initiator, heating was continued for further 30 minutes to maintain the temperature of 90° C., followed by cooling to room temperature. Recovering the product by passing the reaction mixture through filter cloth, an aqueous dispersion of fine crosslinked polymer particles with a solid content 20% was obtained.

This aqueous dispersion was dried on a stainless steel vat in a 60° C. electric hot air dryer and taken out in the form of solid resin, which was dispersed in 60° C. mixed solvent of xylene/n-butyl alcohol=50/50 (weight ratio), to provide a rheology-controlling agent having a solid concentration of 15%. The dispersion had a Gardner viscosity (25° C.) $A_2$, and the polymer had an average particle diameter of 70 nm measured by Beckman Coulter, Inc.'s submicron particle analyzer, N4 PLUS).

EXAMPLES AND COMPARATIVE EXAMPLES

Example 1

A mixture of 70% polyester resin No.1, 85.7 parts (solid content: 60 parts); 70% vinyl polymer, 57.1 parts (solid content: 40 parts); catalyst[note2], 2 parts (solid content: 2 parts); and DISPARLON™ LC-951[note3], 2 parts (solid content: 0.2 part) was diluted by addition of 108.7 parts of an organic solvent[note4], to provide paint No.1 for motorcars having a solid content of 40%.

Examples 2–4 and Comparative Examples 1–4

In the manner similar to Example 1, paint Nos. 2-8 for motorcars were obtained, using the blends as shown in Table 2.

treating agent) was electropainted with ELECRON™ GT-10 (Kansai Paint Co., a cationic electrodeposition paint) to form an electrodeposited coating of 20 μm in dry film thickness. On said coating TP™-65 (Kansai Paint Co., Ltd., an intermediate paint) was applied as an intermediate coating to a thickness (as cured film thickness) of 35 μm, and baked at 140° C. for 20 minutes. Then MAGICRON™ 515 (Kansai Paint Co. Ltd., a top coating base paint) was applied to a thickness of 15 μm (as cured film thickness), followed by 7 minutes' setting to volatilize the solvent. Those clear paint composition Nos. 1-8 for motorcars which were prepared in above Examples and Comparative Examples were spray-coated on the above panels to a thickness of 20 μm (as cured film thickness) and baked concurrently with said top coating base paint at 140° C. for 20 minutes to provide the test panels.

Test Result

Results of the tests using above test panels were as shown in Table 3. As understood from the test results, Tu-kon hardness conventionally used for measuring coating hard-

TABLE 2

Paint Compositions for Motorcars
Blended Components

|  | Example 1 No. 1 | Example 2 No. 2 | Example 3 No. 3 | Example 4 No. 4 | Comparative Example 1 No. 5 | Comparative Example 2 No. 6 | Comparative Example 3 No. 7 | Comparative Example 4 No. 8 |
|---|---|---|---|---|---|---|---|---|
| 70% polyester resin No. 1 (solid content) | 85.7 (60) |  | 85.7 (60) |  |  |  |  |  |
| 70% polyester resin No. 2 (solid content) |  | 85.7 (60) |  | 85.7 (60) |  |  |  |  |
| 70% polyester resin No. 3 (solid content) |  |  |  |  | 85.7 (60) |  | 85.7 (60) |  |
| 70% polyester resin No. 4 (solid content) |  |  |  |  |  | 85.7 (60) |  | 85.7 (60) |
| 70% vinyl polymer (solid content) | 57.1 (40) | 57.1 (40) | 57.1 (40) | 57.1 (40) | 57.1 (40) | 57.1 (40) | 57.1 (40) | 57.1 (40) |
| rheology-controlling agent (solid content) |  |  | 20 (3) | 20 (3) |  |  | 20 (3) | 20 (3) |
| catalyst (note 2) (solid content) | 2 (2) | 2 (2) | 2 (2) | 2 (2) | 2 (2) | 2 (2) | 2 (2) | 2 (2) |
| DISPARLON ™ LC-951 (note 3) (solid content) | 2 (0.2) | 2 (0.2) | 2 (0.2) | 2 (0.2) | 2 (0.2) | 2 (0.2) | 2 (0.2) | 2 (0.2) |
| organic solvent (note 4) | 108.7 | 108.7 | 96.2 | 96.2 | 108.7 | 108.7 | 96.2 | 96.2 |
| 40% paint composition for motorcars (solid content) | 255.5 (102.2) | 255.5 (102.2) | 263 (105.2) | 263 (105.2) | 255.5 (102.2) | 255.5 (105.2) | 263 (105.2) | 263 (105.2) |

(note 2)
catalyst: an equimolar blend of tetrabutylammonium bromide and monobutylphosphoric acid
(note 3)
DISPARLON ™ LC-951: Kusumoto Chemicals, Ltd., a leveling agent
(note 4)
organic solvent: butyl acetate/methyl isobutyl ketone = 50/50

Preparation of Test Panels (For Coating Performance Tests)

Each of cold-drawn steel sheet treated with Palbond™ #3020 (Nippon Parkerizing Co., Ltd., a zinc phosphate ness did not show correlation with scrub resistance, while Universal Hardness (HU) and indentation depth creep (I) at 0.4 mN load showed good correlation with scrub resistance.

TABLE 3

Test Result

| paint composition | Example 1 No. 1 | Example 2 No. 2 | Example 3 No. 3 | Example 4 No. 4 | Comparative Example 1 No. 5 | Comparative Example 2 No. 6 | Comparative Example 3 No. 7 | Comparative Example 4 No. 8 |
|---|---|---|---|---|---|---|---|---|
| coating appearance (note 5) | ○ | ○ | ◎ | ◎ | ○ | ○ | ◎ | ◎ |
| Tu-kon hardness (note 6) | 4 | 4 | 4 | 5 | 4 | 5 | 4 | 5 |

TABLE 3-continued

| paint composition | | Example 1 No. 1 | Example 2 No. 2 | Example 3 No. 3 | Example 4 No. 4 | Comparative Example 1 No. 5 | Comparative Example 2 No. 6 | Comparative Example 3 No. 7 | Comparative Example 4 No. 8 |
|---|---|---|---|---|---|---|---|---|---|
| Coating hardness (note 7) | Universal Hardness (N/mm²) | 115 | 138 | 125 | 146 | 172 | 510 | 178 | 530 |
| | indentation depth creep at 0.4 mN load (μm) | 0.6 | 0.6 | 0.6 | 0.6 | 0.2 | 0.2 | 0.3 | 0.3 |
| acid resistance (note 8) | | ◯ | ◯ | ◯ | ◯ | ◯ | ◯ | ◯ | ◯ |
| scrub resistance (note 9) | | ◯ | ◯ | ⊚ | ⊚ | X | Δ | Δ | Δ |

(note 5)
Coating appearance: Paint composition for motorcars according to the present invention were applied vertically and horizontally onto the test panels and appearance of the coated surfaces was visually evaluated according to the following rating standard:
⊚: Leveling property, gloss and distinctness-of-image-gloss were good on both horizontally finished panels and vertically finished panels.
◯: Leveling property of vertically finished panels was slightly inferior, but leveling property, gloss and istinctness-of-image-gloss of horizontally finished panels were all quite satisfactory.
Δ: Leveling property, gloss and distinctness-of-image-gloss were inferior in both horizontally finished panels and vertically finished panels.
X: Either one or two properties among leveling property, gloss and distinctness-of-image-gloss were notably inferior in horizontally finished panels and vertically finished panels.
(note 6)
Tu-kon hardness: the test panels were left to stand in a constant-temperature room at 20° C. for 4 hours, and hardness of the coatings was measured with TUKON microhardness tester manufactured by American Chain & Cable Company.
(note 7)
Coating hardness: using FISCHERSCOPE ™ H-100 (Helmut Fischer GmbH & Co., a microhardness testing system), continuously varied load from 0.4 mN to 10 mN was applied onto a coating to be tested with Vickers Indenter [a diamond pyramid with a square base area and with an angle of α = 136°] and Universal Hardness (HU) and indentation depth creep at 0.4 mN load (μm) were measured. Said indentation depth creep (I) at 0.4 mN load was determined by gradually reducing the load from 10 mN to 0.4 mN, at which the load was removed and measuring the reduction in indentation depth in the tested coating in 100 seconds after removal of the load.
(note 8)
Acid resistance: each test panel was immersed in 40% sulfuric acid solution by one-half and left at 50° C. for 5 hours, and washed with water. The surface condition of the panel was visually observed and evaluated according to the following standards:
◯: no change observed
Δ: coated surface showed no abnormality, but very minor level difference was observed at the borderline between the immersed portion and non-immersed portion.
X: coated surface whitened
(note 9)
Scrub resistance: On each test panel, polishing powder (DARUMA ™ Cleanser) as kneaded with water into a thick paste was placed, on which a tester terminal was applied under a load of 0.5 kg and moved to make a reciprocating motion 25 times. The surface condition of the coating thereafter was visually evaluated:
⊚: no change was perceived in coated surface gloss
◯: coated surface gloss was slightly changed but the coating was suitable for practical use.
Δ: slight gloss deterioration was perceived
X: notable gloss deterioration was perceived.

What is claimed is:

1. A paint composition for motorcars, which comprises
(A) a carboxyl-containing polyester resin which contains a unit or units derived from alicyclic polybasic acid (a) and/or alicyclic polyhydric alcohol (b), and
(B) a vinyl polymer having epoxy group(s) and hydroxyl group(s) within one molecule and having an epoxy value within a range of 0.8–3.6 mmol/a and a hydroxyl value within a range of 50–600 mgKOH/g,
and which is capable of forming cured coating having Universal Hardness (HU) not higher than 500 N/mm².

2. A paint composition for motorcars according to claim 1, which forms a coating showing the indentation depth creep (I) at 0.4 mN load of at least 0.5 μm.

3. A paint composition for motorcars according to claim 1, in which said alicyclic polybasic acid (a) is selected from the group consisting of cyclohexane-1,3-dicarboxylic acid, cyclohexane-1,4-dicarboxylic acid, hexahydrophthalic acid, hexahydroisophthalic acid, hexahydroterephthalic acid, hexahydrotrimellitic acid, tetrahydrophthalic acid, methylhexahydrophthalic acid, and anhydrides of those acids.

4. A paint composition for motorcars according to claim 1, in which said alicyclic polyhydric alcohol (b) is selected from the group consisting of cyclohexane-1,4-dimethylol, hydrogenated bisphenol A, spiroglycol and dihydroxymethyltricyclodecane.

5. A paint composition for motorcars according to claim 1, in which said polyester resin (A) contains the sum of alicyclic polybasic acid (a) and/or alicyclic polyhydric alcohol (b) at a ratio within a range of 20–70% by weight, based on the total amount of the monomers used for producing the polyester resin (A).

6. A paint composition for motorcars according to claim 1, in which the polyester resin (A) has a weight-average molecular weight within a range of 1,000–1,000,000.

7. A paint composition for motorcars according to claim 1, in which said polyester resin (A) has an acid value within a range of 50–500 mgKOH/g.

8. A paint composition for motorcars according to claim 1, in which said vinyl polymer (B) is obtained by copolymerizing epoxy-containing ethylenically unsaturated monomer, hydroxyl-containing unsaturated monomer and, where necessary, alkoxysilyl-containing ethylenically unsaturated monomer and/or other ethylenically unsaturated monomer or monomers.

9. A paint composition for motorcars according to claim 1, in which the vinyl polymer (B) has a weight-average molecular weight within a range of 500–6,000.

10. A paint composition for motorcars according to claim 1, which further contains a rheology-controlling agent (C).

11. A paint composition for motorcars according to claim 10, in which said rheology-controlling agent (C) is selected from the group consisting of fine particles of crosslinked polymer and polyurea compound.

12. A paint composition for motorcars according to claim 10, which contains 1–30% by weight of rheology-controlling agent (C), based on the total amount of the polyester resin (A) and vinyl polymer (B).

13. A paint composition for motorcars according to claim 1, which contains the polyester resin (A) and vinyl polymer (B), in terms of equivalent ratio of carboxyl groups in the polyester resin (A) to epoxy groups in the vinyl polymer (B), at a ratio within a range of 1:0.5–0.5:1.

14. A paint composition for motorcars according to claim 1, which forms coating having Universal Hardness (RU) within a range of 50–150 N/mm$^2$.

15. A paint composition for motorcars according to claim 1, which forms coating having the indentation depth creep (I) at 0.4 mN load within a range of 0.5–1.0 μm.

16. A multi-layered coating comprising at least one layer of coloring base coating and at least one layer of clear coating, in which the clear coating as the top layer is formed of a clear paint composition for motorcars as described in claim 1.

* * * * *